United States Patent [19]

Kuhn et al.

[11] Patent Number: 5,048,360

[45] Date of Patent: Sep. 17, 1991

[54] C-AXLE GEARING

[75] Inventors: Siegfried Kuhn, Dürnau; Werner Mühlich, Süssen; Robert Räder, Göppingen; Otmar Ritz, Wangen; Hermann Schulten, Birenbach; Manfred Unruh, Göppingen, all of Fed. Rep. of Germany

[73] Assignee: Boehringer Werkzeugmaschinen GmbH, Fed. Rep. of Germany

[21] Appl. No.: 561,144

[22] Filed: Aug. 1, 1990

[30] Foreign Application Priority Data

Aug. 2, 1989 [DE] Fed. Rep. of Germany ....... 3925601

[51] Int. Cl.$^5$ ............................................. F16H 3/22
[52] U.S. Cl. ...................... 74/347; 74/409; 82/143
[58] Field of Search ................. 74/409, 347; 101/248; 82/143, 119

[56] References Cited

U.S. PATENT DOCUMENTS

| 2,197,361 | 4/1940 | Gordon | 74/347 |
| 2,545,053 | 3/1951 | Siekmann et al. | 82/119 X |
| 4,048,880 | 9/1977 | Link | 82/143 |
| 4,524,643 | 6/1985 | Ziegler et al. | 74/409 X |

*Primary Examiner*—Dirk Wright
*Attorney, Agent, or Firm*—Ostrolenk, Faber, Gerb & Soffen

[57] ABSTRACT

A gearing system for a lathe is shiftable from a first position, in which conical gear wheels (16, 25, 26, 36) engage each other with play, to a second position, in which the wheels engage each other without play. Reduced wear is achieved in the first position. High precision is achieved in the second position. Preferably, the system also has parallel-toothed gear wheels (15, 24, 35) which are engaged when the conical gear wheels are disengaged.

10 Claims, 3 Drawing Sheets

C-AXLE GEARING

Lathes are today predominantly equipped also with driven tools which can work not only axially but also radially or tangentially on the workpiece.

For this purpose, the workpiece must be stopped and brought into a specific position of rotation or slowly turned further during the radial or tangential machining.

For this specific positioning or turning of the workpiece, known generally as C-axle, one-third to one-fourth of the main drive force is nevertheless required if, for instance, workpieces which are particularly unbalanced are to be positioned or, for instance for the manufacture of curve guides, etc., the workpiece must be turned slowly in the circumferential surface of a workpiece against the cutting force of the driven tool.

Such positionings and slow-turning movements must be capable of being carried out very accurately, about 1/10,000th of an angular degree being striven for. Such high precision cannot, however, be obtained by rotation, for instance, via the existing gearing of the main spindle which customarily has play in order to contain the wearing of the gearing within limits.

Accordingly, the specific determination of the position of rotation of the workpiece or its slow, very precisely defined rotation has up to now been obtained in the manner that a so-called main drive gear, arranged fixed for rotation and free of play on the main spindle, was driven directly for said drive of the C-axle without the interpositioning of other gear trains having play. In addition, it was attempted to make this direct drive of the main drive gear as free as possible of play in order, in this way, to optimize the precision of the positioning of the C-axle. This was done, for instance, in the manner that the main drive gear was a spur-toothed gear wheel with teeth which are parallel to the axis of rotation and into which there could be engaged for the driving of the C-axle a corresponding gear wheel which, however, was divided in a plane perpendicular to the axis of rotation of the engaged gear wheel. These two halves of the engaged gear wheel could be displaced with respect to each other by spring force or the like, as a result of which the tooth engagement with the mating wheel could be held substantially free of play.

Another solution, such as used in the Applicant's present VDF-C machine, consisted in developing this main drive gear on the main spindle as a worm wheel into which a worm was swung in case of need of the C-axle drive. In order to be able to keep this worm/worm wheel pair as free of play as possible, the worm had to be pressed against the worm wheel with relatively high force, generally applied hydraulically. For this purpose, the worm was located on the end of a relatively long shaft which was supported in a correspondingly dimensioned rocker on which the hydraulic force for the pressing together of the worm/worm-wheel pair was applied.

Aside from the fact that this worm/worm-wheel pair is expensive to manufacture, a large amount of space was required by the said development of the C-axle drive since, for instance, the pivot point around which the rocker, in which the worm shaft was mounted, turned also had to be developed sufficiently strong to be able to take up said high drive forces of the C-axle.

Regardless of for which one of the types described the main drive gear for the C-axle is driven, a separate motor is necessary for the drive or else the drive from the already existing motor of the main spindle drive must be fed so free of play that the desired precision of positioning of the C-axle is still obtained. In both cases, this means a considerable financial expense and, in addition, a relatively large loss of construction space since, for instance, feeding from the existing motor of the main spindle gearing is possible only with the addition of further shafts and gear wheels and thus enlargement of the spindle box. Another disadvantage of this C-axle drive is that, particularly when effected via the worm/worm-wheel pair, it was subjected to relatively strong wear, so that the precision of the C-axle drive decreases with increasing time of operation.

The object of the present invention, therefore, is to create a drive of the C-axle having the desired precision with respect to the transmission of speeds of rotation and positions of rotation in the smallest possible space and thus at the smallest possible financial expense, in which connection, insofar as possible, the wear occurring with increasing period of operation, which wear decreases the precision, can be compensated without great expense.

The gearing arranged between the motor and the work spindle consists of several, generally three, gear shafts, the first of which is driven by the motor and the last of which forms the main spindle. For the driving of the main spindle, AC motors are today predominantly employed; although substantially more expensive than the DC motors previously used, they are, however, subject to less wear, due to the elimination of brushes and collectors, and, in particular, offer the advantage of good adjustability of the speed of rotation. An average value of such a motor for the driving of the main spindle would be a rated power of about 30 KW with a maximum speed of rotation of 6300 rpm. Such an AC motor can be accurately positioned with respect to its position of rotation to 1/1000ths of a degree with a speed of rotation reduced to 5 rpm.

The said object of the invention is now achieved in the manner that this precise adjustability of the motor for the main drive is transmitted, without reduction of precision and therefore free of play, to the main spindle in the manner that the interposed gearing comprises a shift position in which all gear-pairs consist of special known, slightly conical gear wheels, such as manufactured, for instance, by the Wittmann Company, which can be brought so far into each other that no measurable play is present any longer. In the case of these gear wheels, the circumferential surface is not cylindrical but is developed with a conicity of about 2° and the height and thickness of the individual teeth along the longitudinal extent thereof also change to an equivalent extent. Over the finite width of a gear wheel there therefore take place an infinite number of shiftings of profile along a tooth. Such gear wheels have been used up to now in order to be able precisely to adjust a predetermined play between two gear wheels upon the mounting of gears and the like—which play must always be present in order to avoid excessive wear. This is possible in the manner that a relatively large axial change in position of the gear wheel in question is necessary in order to effect a given change in the play to be established. Such large axial changes in position are, however, easy to obtain by means of spacer disks and the like upon the mounting or overhauling of a gearing.

In the present case, the gear wheels, however, are to engage in each other until there is freedom from play.

This, to be sure, results in increased wear of these pairs of gear wheels but since the drive of the C-axle takes up only a proportionately extremely small part of the operating time of a lathe, this can be tolerated, particularly as wear of these conical gear wheels does not express itself in a reduction of precision of the transmission of speed of rotation and position of rotation of the C-axle if these conical gears are inserted in each other always with the same force. In such case, only the axial position of the gear wheels used changes, but not their precision of transmission with respect to position of rotation and speed of rotation.

The transmission ratio upon the driving of the C-axle via the conical gear wheels is naturally of the same value as the smallest transmission ratio in normal operation of the main spindle but the drive speed of rotation is substantially less, due to additional lower speed of rotation of the motor. For certain cases of use, however, it is necessary to use this reduced speed of rotation without the precision of transmission with respect to position of rotation and speed of rotation, such as can be obtained only with play-free inter-engagement of the conical gear wheels, being necessary. For this case of use, it is possible to drive the main spindle, to be sure, via the gear pairs of the conical gear wheels but not to bring them together until there is freedom from play but rather to obtain an inter-engagement of the conical wheels which has play and corresponds to the customary gear wheel bearing picture by an axial spacing of a few millimeters. In this way, the wear of the conical gear wheels is further reduced.

In addition to this, there is, of course, at least one shift position of the gearing in which the main spindle is driven via normal parallel-toothed gear wheels with rated speed of rotation, the slightly conical gear wheels being out of engagement.

In the event that more than one of the slightly conical gear wheels which can be displaced are seated on one of the gear shafts, two possibilities are conceivable: either the axial spacing of the slightly conical gear wheels with respect to each other is fixed and they can only be axially displaced together with one another, or each of these slightly conical gear wheels is displaceable axially independently of each other. In the latter case, it must be seen to it that in the event of the driving of the C-axle, each of these slightly conical gear wheels is pressed hydraulically or by spring force, always with the same axial pressure, against its mating wheel.

The advantage of this construction is that over a very long period of time, despite wear of the gear wheels, no adjusting work or repair is necessary and a constant play-free engagement is ensured. If the slightly conical gear wheels, on the other hand, are only jointly displaced axially, then the play-free condition is always reached initially in the case of one of these pairs of gear wheels while in the case of the other pair or pairs of these gear wheels there is still a slight play. This would have to be optimized upon the mounting of the gearing by equalization by means of spacer disks or the like until a play-free condition is obtained. However, if, during the course of use, non-uniform wear results between the different slightly conical gear wheels on the same shaft, a readjustment of the axial spacing of these gear wheels with respect to each other would be necessary.

The advantage, however, is that for these conical gear wheels which are seated and displaceable jointly on one shaft only a single displacement device is necessary.

This displacement device will generally be a hydraulically actuated piston/cylinder unit, there preferably being involved a double-piston arrangement so as to make also more than two shift positions of the unit to be displaced possible. This hydraulic unit can be connected, for instance, to a pusher which engages into the unit to be displaced and the position of which is controlled and guided via the control edges of a multi-way valve.

Although at least one of the stages of the gearing is developed so as to be self-locking, it must be expected that as a result of strongly unbalanced workpieces or of a necessary slow turning movement in opposition to a high cutting force of a driven tool the self-locking might be overcome. For such cases, a mechanical brake is preferably provided, for instance a shoe brake, on the main spindle or on one of the other gear shafts.

In order to be able to monitor and control the position of rotation, as well as the speed of rotation of the main spindle, its position and speed of rotation are monitored by a measuring device. If the transmitter elements do not directly scan the rotation of the main spindle, the rotation thereof is preferably to be transmitted via a pulley to another pulley which serves exclusively for the scanning by the transmitter elements, for instance opto-electrical sensors, and therefore, due to the absence of any substantial mechanical loads, can easily be held without slippage with respect to the main spindle itself. Since the desired precision of the positioning as well as of the measurement of the speed of rotation differs greatly for rated speed of rotation and the substantially slower operation of the C-axle, two different sensors are preferably used for these two regions.

The advantages of this embodiment of a C-axle drive are that not only is the expense for the simultaneous use of the slightly conical gear wheels substantially less than the expense for the development of an inward swingable worm drive or of a spreadable additional drive gear wheel but, in addition, the development with the slightly conical gear wheels also requires substantially less expense for maintenance. Furthermore, the solution in accordance with the invention requires substantially less space, and greater precision of the C-axle drive is possible than that afforded by the prior art.

BRIEF DESCRIPTION OF THE DRAWINGS

Embodiments in accordance with the invention will be explained below, by way of example with reference to the figures of the drawing, in which.

DETAILED DESCRIPTION OF THE PREFERRED EMBODIMENTS

Figure 1:
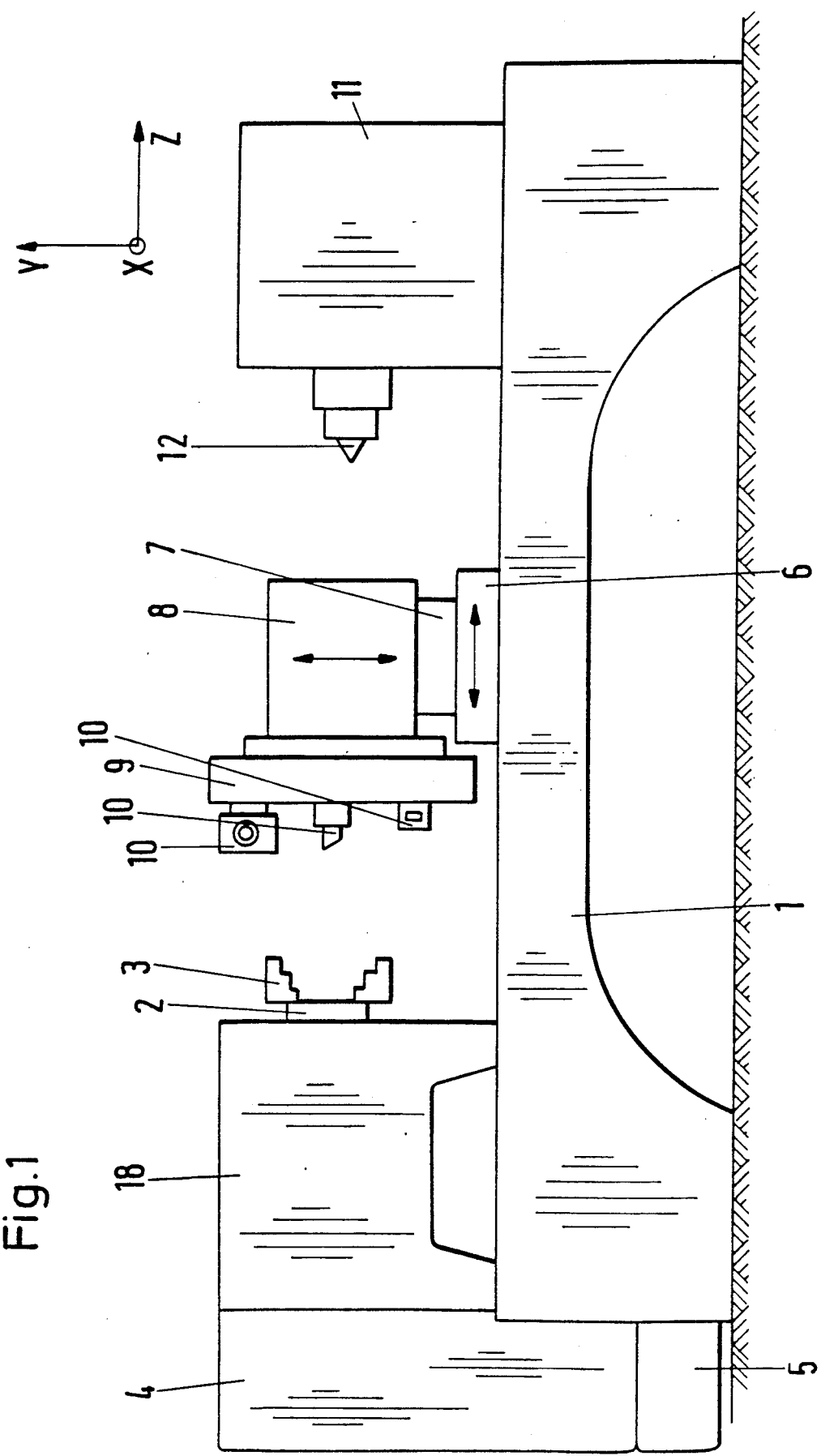
FIG. 1 is a basic diagram of a lathe.

FIG. 1 shows an ordinary lathe in which the drive of the invention can be used. On the bed 1 of the lathe there is seated the headstock 18 which is seated between the gear box 4 and the chuck 2 which is to be driven and on which a workpiece (not shown) is fastened and driven by means of the jaws 3. On the opposite end of the machine tool there is the tailstock 11 which has a center for the holding of the workpiece. Between the tailstock 11 and headstock 18 there is the tool unit consisting of a longitudinal slide 6 which is moveable in Z direction along the bed 1 and on which, in its turn, a cross slide 7 can be moved in X direction. On this cross slide 7 there is arranged, with adjustable height, a Y-slide 8 which, for instance, bears a tool turret 9. On the latter there are arranged the individual tools 10, among which there are also driven tools such as, for instance, the radially or tangentially acting drills indicated in the upper region. In order to be able to use such a tool, the workpiece, and thus the chuck 2, must be accurately positioned with respect to the angle of rotation and possibly then be capable of being slowly moved in well-defined manner, namely with a precision of at least 1/1000th degree.

Figure 2:
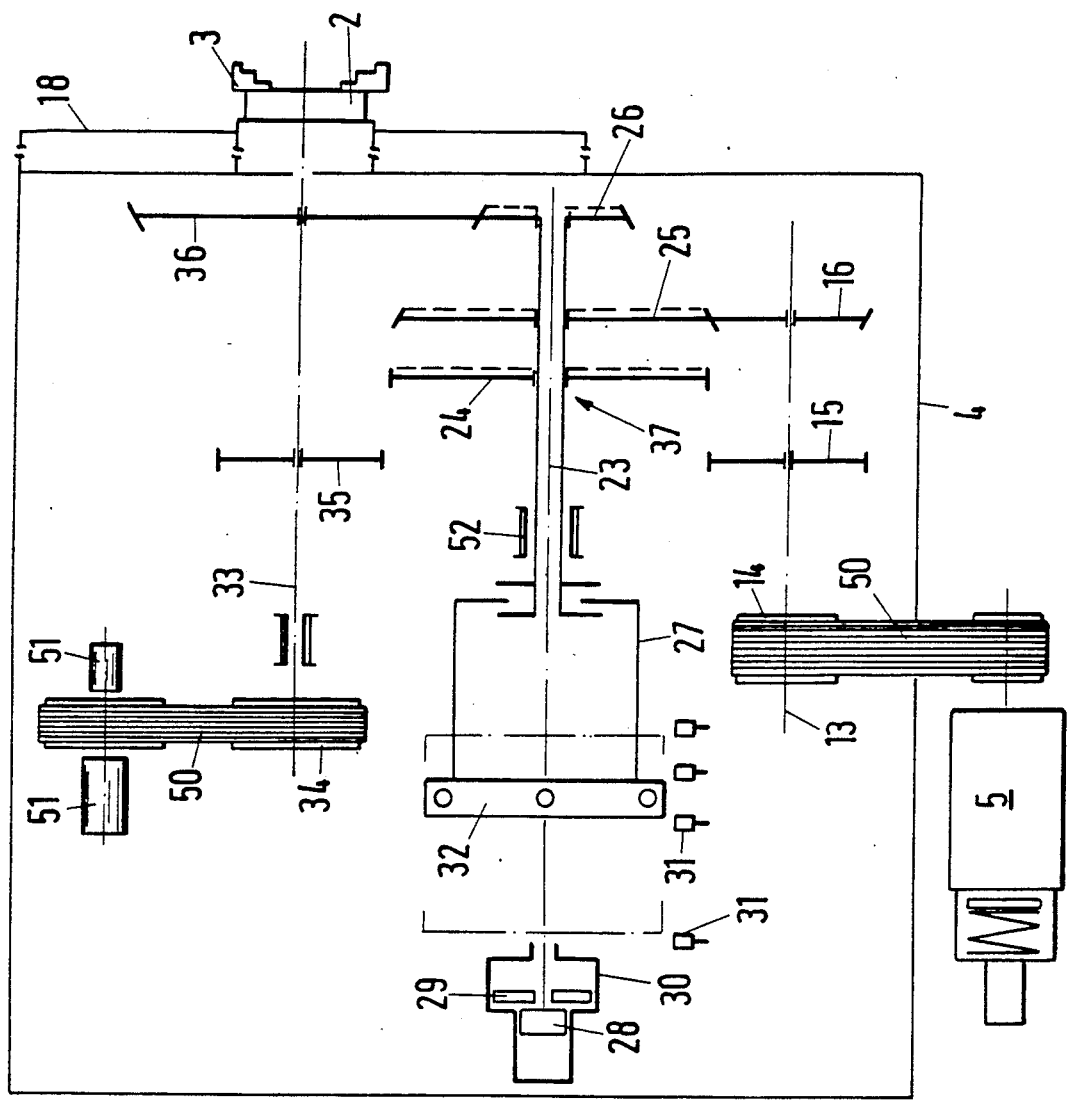
FIG. 2 is a schematic showing of the drive in accordance with the invention.

FIG. 2 is a diagrammatic showing of a drive in accordance with the invention which is arranged in the gearbox 4. The gearing consists of first, second and third gear shafts 13, 23, 33, the third and last gear shaft 33 being customarily developed as main spindle. The first gear shaft 13, which is generally in the lowest position, is driven by means of several V-belts 50 and a pulley 14 from a motor 5 which is arranged outside the gearbox 4. On this first gear shaft 13 there are furthermore seated a parallel-toothed gear wheel 15 as well as a slightly conical gear wheel 16 having the same number of teeth and also of the same size. On the second gear shaft 23, which is arranged parallel to the first gear shaft 13, there are arranged three gear wheels, namely a parallel-toothed gear wheel 24, and large and small slightly conical gear wheels 25 and 26 respectively. These three gear wheels can be displaced axially so that the parallel-toothed gear wheel 24 as well as the conical gear wheel 25 come into engagement with, in each case, the gear wheels 15, 16 of the same type of the first gear shaft 13. On the third gear shaft 13, in turn, there are seated a parallel-toothed gear wheel 35 and a slightly conical gear wheel 36, the latter being adapted to be brought into engagement with the slightly conical gear wheel 26 of the second gear shaft 23 while the parallel-toothed gear wheels 35 and 24 of the third and second gear shafts respectively can engage with each other.

The shifting of the gearing is effected in the manner that the gear wheels of the second gear shaft 23 are axially displaceable. The axial distance apart of the gear wheels 24, 25, 26 remains, in this connection, the same, so that this displacement unit 37 is displaceable as a whole axially with respect to the second gear shaft. The displacement is effected in the manner that pushers 27 engage in form-locked manner into the displacement unit 37, said pushers being rigidly attached to a control beam 32 which, in its turn, is actuated by a hydraulic piston/cylinder unit. The hydraulic cylinder 30, which is directed in axial direction, contains two hydraulic pistons 28 and 29 in order to be able to move the control beam 32 not only into the two possible end positions but also into a well-defined intermediate position.

These end positions of the control beam 32 and thus of the entire displacement unit 37 are, on the one hand, the left-hand end position in which the main spindle and thus the third gear shaft 33 are driven via interengaging wheel pairs of the parallel-toothed gear wheels 15, 24 and 35 from the first gear shaft 13. The gear connection represents the normal operation of the lathe with maximum speed of rotation and minimum moment of rotation.

If the displacement unit 37 is brought, on the other hand, into the right-hand end position, then the slightly conical gear wheels 16 and 25 and 26 and 36 respectively are pushed axially so strongly into each other that a play-free drive of the third gear shaft 33, i.e. of the main spindle, is effected from the motor 5. Since substantially lower speeds of rotation of the main spindle are necessary in this case, the transmission ratios of this gear connection are dimensioned accordingly.

Since this end position of the displacement unit 37 is the right-hand end position, the oblique positions of the two slightly conical gear wheels 25 and 26 of the displacement unit 37 are so selected that their imaginary cone tip lies to the right of the two gear wheels 25 and 26 and the smaller of the two gear wheels is arranged to the right of the larger one. The imaginary gear tips of the slightly conical gear wheels 16 and 36 on which the first and third gear shafts respectively are arranged point accordingly to the left from the corresponding gear wheels in order to be able to engage with the corresponding gear wheels of the second gear shaft.

These two end positions of the displacement unit are moved into and controlled in the manner that the control beam 32 in this way actuates the two outermost existing sensors 31, which are ordinarily the control edges of a multi-way valve. The sensors 31 for the right-hand end position are, however, not limit shifts in the sense that the pressure acting on the hydraulic piston 28 and thus the displacement unit 17 is disconnected towards the right. Rather, this pressure must be maintained continuously in order to assure freedom from play in the right-hand end position. Two additional sensors 31 permit the movement of the control beam 32 and of the displacement unit 37 into an intermediate position. This intermediate position, to be sure, is only a few millimeters away from the right-hand end position and, in this connection also, the same slightly conical gear wheels are in engagement with each other. However, the slightly conical gear wheels of the displacement unit 37 are not pressed with a given pressure inwards until resting into the corresponding mating wheels, but rather the gear wheel pairs are operated with retention of normal play between the pair. As a result of the slight conicity of these gear wheels of about 2°, this results in an axial spacing with respect to the play-free position of 1 to 3 mm so that the intermediate position also varies only by this distance from the right-hand end position.

Although the gearing is developed so as to be self-locking, a shoe brake 52 is provided on the third gear shaft 33 in order to prevent, in the case of workpieces of great imbalance or of high cutting forces of the driven tools acting unilaterally with respect to the workpiece, undesired rotation of the main spindle and thus of the workpiece from taking place. In the two right-hand positions of the displacement unit, the stepdown transmission ratio on this last gearing stage is four times as great as in the left-hand end position of the displacement unit 37.

FIG. 2 shows the entire displacement unit 37 in the intermediate position in which the slightly conical gear wheels are in engagement with each other with play. The play-free engagement of these gear wheels is symbolized by the dashed lines.

In order, upon operation of the C-axle drive, to be able accurately to verify and regulate the position of rotation and the speed of rotation of the third gear shaft 33 and therefore of the main spindle and thus of the chuck 2, there is provided on the third gear shaft 33, in addition to the parallel-toothed gear wheel 35, the shoe brake 52 and the slightly conical gear wheel 36, also a pulley 34 which transmits the rotation of the third gear shaft 33 via one or more belts 50 to another pulley 34 which is scanned by sensors 51. Since the second pulley is not subject to any mechanical load, this transmission takes place completely without slippage so that the values scanned by the sensors 51 are identical to those of the main spindle. Since the measurement ranges of such sensors are relatively small, two different sensors 51 are used for normal operation at rated speed of rotation as well as for the range of reduced speed of rotation in the case of C-axle drive, the sensors being generally opto-electronic sensors.

Outside the gearbox 4 the chuck 2 with the jaws 3 is also furthermore arranged on the gear shaft 33.

Figure 3:
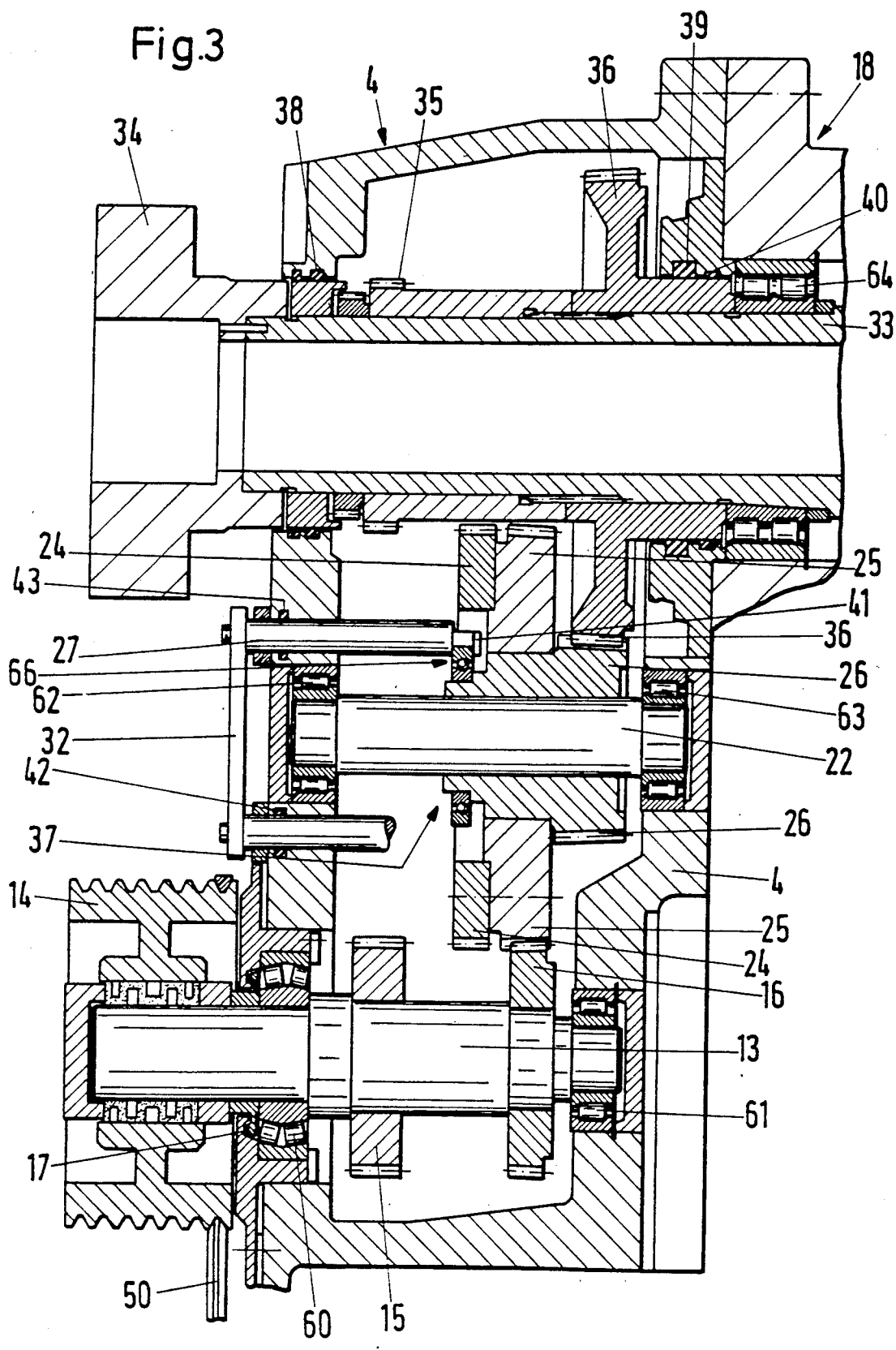
FIG. 3 is a more detailed showing of a gearing in accordance with the invention.

FIG. 3 shows a concrete structural development of a gearing in accordance with the invention.

In the same way as in the diagrammatic showing of FIG. 2, three gear shafts 13, 22, 33 can be noted. The third gear shaft 33 is, in this case, developed as a hollow shaft and represents the main spindle of the lathe.

The entire gearing is arranged in a housing, the gearbox 4, behind the head stock 18. The lower-most, first gear shaft 13 is mounted via roller bearings 60, 61 in the gearbox 4 and extends beyond it on one side since on this freely protruding end there is seated a pulley 14 into which the feeding of the force from a motor (not shown) takes place via several V-belts 50, only one of which has been shown by way of example in FIG. 3. The pulley 14 is, in this connection, clamped in force-locked manner on the free end of the first gear shaft 13 and the inside of the gearbox 4 is sealed off from the outside by corresponding seals 17.

Within the gearbox 4, a parallel-toothed gear wheel 15 and, in the vicinity of the right-hand bearing place, a slightly conical gear wheel 16 the inclination of which points to the left are seated fixed for rotation and non-displaceable in axial direction on the first gear shaft 13.

The third gear shaft 33, which is developed as a hollow shaft and is supported via anti-friction bearings 64 in the headstock 18, also extends beyond the gearbox 4 on the same side as the first gear shaft 13. On its free end, the third gear shaft 33 is developed as a pulley 34 in order to be able to transmit angle of rotation and speed of rotation of the main spindle without load or slippage to another pulley (not shown) which serves merely for the tapping off of the angle of rotation and the speed of rotation by suitable sensor in order to control the main drive. In the case of this third gear shaft 33 also, there is, of course, a corresponding sealing off of the inside of the gearbox by means of suitable seals 38, 39, 40.

While the two gear wheels on the first gear shaft 13 are of approximately the same size, a small parallel-toothed gear wheel 35 is seated on the third gear shaft 33 in the vicinity of the left-hand housing wall while another, larger slightly conical gear wheel 36 is seated in the vicinity of the right-hand end wall. Here also, the inclination of the conical gear wheel 36 is so selected that the imaginary cone tip points towards the side of the other gear wheel and the inclination of the circumferential surface of this gear wheel is about 2° with a corresponding tapering of the cross section of the tooth in this direction. These two gear wheels 35, 36 are also fastened, fixed for rotation and nondisplaceable in axial direction, on the hollow third gear shaft 33.

Between the first and the third gear shafts 13 and 33 a second gear shaft 22 is arranged which is also mounted via anti-friction bearings 62, 63 in the gearbox 4. On this second gear shaft 22, there are arranged the axially displaceable gear wheels which are necessary for the shiftability of the gearing of the invention. In this case there are concerned three gear wheels which are firmly attached in axial direction to each other and are displaceable jointly as displacement unit 37 along the second gear shaft 22.

This displacement unit 37 consists, extending from left to right, of a spur-toothed gear wheel 24 which, in the left-hand end position of the displacement unit, engages both with the parallel-toothed gear wheel 15 of the first gear shaft 13 and with the parallel-toothed gear wheel 35 of the third gear shaft 33. Next to this gear wheel 24 there is a slightly conical gear wheel 25 of approximately the same size, the tooth bevel of which points to the right so that it can be brought into engagement with the opposite obliquely placed conical gear wheel 16 on the right-hand side of the first gear shaft 13. When this is the case, the third gear wheel of the displacement unit 37, which is a substantially smaller, slightly conical gear wheel 26, engages with the conical gear wheel 36 of the third gear shaft 33.

Due to these size relationships, a substantially greater stepdown ratio is present in the gear position in which the conical gear wheels are in engagement with each other than in the left-hand end position of the displacement unit 37 of the center gear shaft 22.

The displacement unit 37 is displaced in the manner that on this rotating displacement unit 37 there is seated an additional anti-friction bearing 66 the one race of which turns together with the displacement unit 37 while noses 41 engaging behind the other, stationary race connect the pusher 27 in axial direction rigidly to the stationary race of the bearing 66. These pushers 27 extend outward through the outer wall of the gearbox 4, where the passage is again sealed off by seals 42, 43. The individual pushers 27 are connected to each other via a transverse extending control beam 32 and are thus actuated jointly in axial direction by means of the hydraulic unit shown in FIG. 2 but not in FIG. 3, consisting of the cylinder 30 as well as the hydraulic pistons 28 and 29. In this connection, the monitoring and control of the actual position of the control beam 32 and thus of the entire displacement unit 37 is effected in the manner that the axial movement of, for instance, the control beam 32 controls the piston of a multi-way valve, as described in FIG. 2.

In the same way as in the diagrammatic showing of FIG. 2, the gearing of FIG. 3 can also, upon engagement of the conical gears 16, 25, 36, first of all assume the play-free right-hand end position in which these gear wheels are pressed into each other at all times with a predetermined force produced by the hydraulic action on the displacement unit 37 against the axially fixed conical gear wheels 16 and 36. If the displacement unit is pulled back from this right-hand end position towards the left by a distance within the millimeter range then, the same four conical gear wheels are, to be sure, still in engagement with each other, but now with the customary play of one pair of gear wheels, which, to be sure, results in much less wear of the pairs of gear wheels but, on the other hand, does not make an exact reproduction of slight turning movements possible.

Thus the main spindle 33 can be driven both with play at rated speed of rotation via the obliquely toothed gear wheels and with play at reduced speed of rotation via the parallel-toothed gear wheels. However, the main spindle can also be driven with the same reduced speed of rotation without play, as is necessary for the operation of the C-axle.

We claim:

1. A shiftable gearing system for a lathe, the system comprising:
   a main spindle for supporting and driving a workpiece, the main spindle including a gear shaft (33) and a first slightly conical gear wheel (36);
   second and third slightly conical gear wheels (26, 25);
   driving means for driving the gearing system, the driving means including a gear shaft (13) and a fourth slightly conical gear wheel (16); and
   shifting means for shifting the system from a first position, in which the first and second gear wheels engage each other with play and the third and fourth gear wheels engage each other with play, to a second position, in which the first and second gear wheels engage each other without play and the third and fourth gear wheels engage each other without play, and in which the main spindle is driven by the driving means exclusively through the first, second, third and fourth gear wheels.

2. A shiftable gearing system for a lathe, the system comprising:
   a main spindle for supporting and driving a workpiece, the main spindle including a gear shaft (33) and a first slightly conical gear wheel (36);
   a displaceable unit which includes second and third slightly conical gear wheels (26, 25);
   driving means for driving the gearing system, the driving means including a gear shaft (13) and a fourth slightly conical gear wheel (16); and
   shifting means for shifting the system from a first position, in which the first and second gear wheels engage each other with play and the third and fourth gear wheels engage each other with play, to a second position, in which the first and second gear wheels engage each other without play and the third and fourth gear wheels engage each other without play, and in which the main spindle is driven by the driving means exclusively through the first, second, third and fourth gear wheels.

3. The system of claim 2, wherein the driving means includes a first parallel-toothed gear wheel, the first parallel-toothed gear wheel and the fourth conical gear wheel being located on the gear shaft of the driving means;
   wherein the displaceable unit includes a second parallel-toothed gear wheel, the system further comprising a center shaft, the second parallel-toothed gear wheel and the second and third conical gear wheels being displaceably located on the center shaft;
   wherein the main spindle includes a third parallel-toothed gear wheel, the third parallel-toothed gear wheel and the first conical gear wheel being located on the gear shaft of the main spindle; and
   wherein the shifting means is arranged to shift the system into a third position in which the first and second parallel-toothed gear wheels are in engagement with each other, the second and third parallel-toothed gear wheels are in engagement with each other, the first and second conical gear wheels are not in engagement with each other, and the third and fourth conical gear wheels are not in engagement with each other.

4. The system of claim 2, wherein the conical gear wheels are spur-toothed conical gear wheels.

5. The system of claim 2, wherein the conical gear wheels are helical-toothed conical gear wheels.

6. The system of claim 3, wherein the displaceable unit has an anti-friction bearing, the shifting means including non-rotatable pushers for axially displacing the bearing between the first position and the second position.

7. The system of claim 3, further comprising a shoe brake for braking the gear shaft of the main spindle.

8. The system of claim 3, wherein the main spindle includes a chuck for receiving the workpiece.

9. The system of claim 3, wherein the driving means includes a pulley and a motor for driving the pulley.

10. The system of claim 9, wherein th driving means includes V-belts which connect the motor to the pulley.

* * * * *